United States Patent
Yoshikawa (10) Patent No.: US 9,440,495 B2
(45) Date of Patent: Sep. 13, 2016

(54) PNEUMATIC TIRE (75) Inventor: Yusuke Yoshikawa, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 280 days.

(21) Appl. No.: 13/876,391

(22) PCT Filed: Sep. 28, 2011

(86) PCT No.: PCT/JP2011/005475
§ 371 (c)(1),
(2), (4) Date: Apr. 29, 2013

(87) PCT Pub. No.: WO2012/042873
PCT Pub. Date: Apr. 5, 2012

(65) Prior Publication Data
US 2013/0206310 A1 Aug. 15, 2013

(30) Foreign Application Priority Data

Sep. 28, 2010 (JP) .................................. 2010-217388

(51) Int. Cl.
*B60C 9/22* (2006.01)
*B60C 9/18* (2006.01)
*B60C 9/20* (2006.01)

(52) U.S. Cl.
CPC ............... *B60C 9/18* (2013.01); *B60C 9/2006* (2013.04); *B60C 9/22* (2013.01); *B60C 2009/2038* (2013.04); *B60C 2009/2219* (2013.04); *B60C 2200/06* (2013.04); *Y10T 152/10801* (2015.01)

(58) Field of Classification Search
CPC ............ B60C 9/22; B60C 2009/2038; B60C 2009/2219; B60C 9/2006; Y10T 152/10801
See application file for complete search history.

(56) References Cited

U.S. PATENT DOCUMENTS 6,367,527 B1 * 4/2002 Cluzel .................. B60C 9/2006
                                                                  152/454
6,533,012 B1 * 3/2003 Jardine et al. ................. 152/527

(Continued)

FOREIGN PATENT DOCUMENTS

JP          11-105152 A      4/1999
JP       2007-106152 A      4/2007

(Continued)

OTHER PUBLICATIONS

Chinese Office Action, dated Dec. 23, 2014, issued in corresponding Chinese Patent Application No. 201180056654.0.

(Continued)

*Primary Examiner* — Justin Fischer
*Assistant Examiner* — Robert Dye
(74) *Attorney, Agent, or Firm* — Sughrue Mion, PLLC (57) ABSTRACT

The present invention provides a pneumatic tire having a carcass 11, at least one circumferential belt layer 17 provided on the outer side in the tire radial direction of the carcass 11, and plural intersecting belt layers 18 provided on the outer side in the tire radial direction of the circumferential belt layer 17, at least one of the plural intersecting belt layers having wider belt width in the tire widthwise direction than the circumferential belt layer 17, comprising: at least one layer of end-portion circumferential belt 15 provided in respective tire widthwise tread end regions on the outer side of the carcass 11 and on the inner side of the circumferential belt layer 17 in the tire radial direction; and at least one layer of slant belt 16 provided in the tire widthwise tread central region on the outer side of the carcass 11 and on the inner side of the circumferential belt layer 17 in the tire radial direction.

7 Claims, 3 Drawing Sheets

(56) References Cited

U.S. PATENT DOCUMENTS

| 7,575,031 | B2* | 8/2009 | Manno | B60C 9/2006 |
| | | | | 152/531 |
| 7,779,878 | B2* | 8/2010 | Isobe | 152/526 |
| 2008/0156410 | A1 | 7/2008 | Isobe | |
| 2009/0277552 | A1* | 11/2009 | Maruyama | B60C 3/04 |
| | | | | 152/454 |
| 2010/0065181 | A1 | 3/2010 | Terada | |
| 2011/0240198 | A1* | 10/2011 | Suda et al. | 152/527 |

FOREIGN PATENT DOCUMENTS

| JP | 2007106152 A | 4/2007 |
| JP | 2008-201147 A | 9/2008 |
| JP | 2010-116065 A | 5/2010 |
| JP | 2010-155533 A | 7/2010 |
| JP | 2010530831 A | 9/2010 |
| WO | 2008/075523 A1 | 6/2008 |
| WO | 2010/070887 A1 | 6/2010 |

OTHER PUBLICATIONS

Japanese Office Action, dated Jun. 3, 2014, issued in corresponding Japanese Patent Application No. 2010-217388.
Communication dated Jan. 20, 2015 from the Japanese Patent Office in counterpart Application No. 2010-217388.

\* cited by examiner

FIG. 2

PNEUMATIC TIRE

CROSS REFERENCE TO RELATED APPLICATIONS

This application is a National Stage of International Application No. PCT/JP2011/005475 filed Sep. 28, 2011, claiming priority based on Japanese Patent Application No. 2010-217388 filed Sep. 28, 2010, the contents of all which are incorporated herein by reference in their entirety.

TECHNICAL FIELD

The present invention relates to a pneumatic tire and in particular to a pneumatic radial tire for heavy load employing a circumferential belt for retaining tire configuration and suitable for use in a truck and a bus.

BACKGROUND ART

There is conventionally known a radial tire for heavy load employing a circumferential belt provided in the form of a layer in the tire circumferential direction on the outer side in the tire radial direction of a carcass, e.g. a super flat pneumatic tire such as a truck and bus radial tire (TBR).

Single-tire mount structure has been increasingly employed in a large truck/bus in recent years in order to reduce fuel consumption and weight of the vehicle, whereby there has been increasingly demand for a tire having relatively low aspect ratio and wide tread base width to adapt to such single-tire mount structure as described above. A pneumatic tire having a relatively low aspect ratio generally includes belts constituted of a pair of intersecting belts and a circumferential belt for reinforcement in the tire circumferential direction. A low-aspect ratio tire aims at, by being provided with such a belt structure as described above, retaining adequate tire configuration at a high internal pressure exerted thereon and improving resistance to tire radial direction growth caused by centrifugal force and low-heat generation property during running of a vehicle, to eventually improve tire durability.

Examples of the tire employing a circumferential belt for reinforcement in the tire circumferential direction include a pneumatic tire with a belt structure using wavy-formed "wavy cords" applied thereto as disclosed in Patent Literature 1. Use of a circumferential belt is essentially required in terms of maintaining adequate tire configuration when a low-aspect ratio tire is pursued. Further, durability of the tire also needs to be improved because load applied to a tire has been increasing year by year.

CITATION LIST

Patent Literature

PTL 1: JP-A 2008-201147

SUMMARY OF THE INVENTION

Technical Problems

A circumferential belt causing a good effect of retaining adequate configuration of a tread portion of a tire, i.e. or making magnitude of expansion in the tire radial direction of the tread portion uniform, however, hardly contributes to improving shear rigidity of the tread portion. Therefore, a "slant" belt in which belt cords are disposed to be inclined with respect to the equatorial line of the tire is also required in order to meet the level of wear resistance required of the tire. Ratio of the width of the slant belt in the tire widthwise direction with respect to the overall tire width needs to be equal to or higher than a certain value because the length in the tire widthwise direction of the slant belt determines wear resistance of the tire. Further, a slant belt needs to have a structure in which belt cords of an upper belt and belt cords of an lower belt layer intersect each other with respect to the tire equatorial line therebetween.

A circumferential belt not only functions to efficiently retain adequate configuration of a tire but also serves to make ground contact pressure of a tread surface uniform when the tire is in contact with the ground with load exerted thereon. In this connection, a circumferential belt having too narrow width in the tire widthwise direction causes ground contact pressure at the tread surface to be extremely low on the outer side in the tire widthwise direction of a region where the circumferential direction belt is provided, although the ground contact pressure is relatively high in the region where the circumferential direction belt is provided, thereby generating partial wear in the tire. It is therefore necessary that ratio of the width of the circumferential belt in the tire widthwise direction with respect to the overall tread width needs to be equal to or higher than a certain value. The ratio, i.e. circumferential belt width/overall tire with, is to be increased as the aspect ratio of a tire decreases.

It should be further noted that a circumferential belt serving to efficiently retain adequate configuration of a tire inevitably increases tire weight when the circumferential belt is constituted of plural layers, which increase in tire weight certainly deteriorates fuel efficiency of a vehicle. A single-layer structure is therefore preferable for a circumferential belt. In a case where a circumferential belt has a single-layer structure accordingly, the inclination angle of slant cords with respect to the tire equatorial line of a slant belt provided on the circumferential belt must be made small in order to adequately retain tread configuration when the tire is inflated at the prescribed internal pressure.

When a belt structure inside a tire is constituted of only a circumferential belt and a slant belt having relatively small inclination angle with respect to the tire equatorial line in view of the facts described above, a carcass supports most of tension in the tire widthwise direction, although the tension in the tire widthwise direction is even larger than tension in the tire circumferential direction. This situation occurs because, in a case where a belt structure inside a tire is constituted of only a circumferential belt and a slant belt having relatively small inclination angle, degree of inclination of dented tread at a dented portion of a tread, generated when a projection on a road pushes a tread portion on the inner side in the tire radial direction when the tire rides over the projection, is severer in the tire widthwise direction than in the tire circumferential direction. In this case, forces resulted from tire deformation in the tire widthwise direction is supported by only the carcass ply, whereby the carcass ply may possibly be fractured.

An object of the present invention is to provide a pneumatic tire having a belt structure capable of improving tire durability, while suppressing an increase in weight of the tire.

Solution to the Problems

In order to achieve the aforementioned object, the present invention provides in one aspect thereof a pneumatic tire having a carcass, at least one circumferential belt layer provided on the outer side in the tire radial direction of the carcass, and plural intersecting belt layers provided on the outer side in the tire radial direction of the circumferential belt layer, at least one of the plural intersecting belt layers having wider belt width in the tire widthwise direction than the circumferential belt layer, comprising: at least one layer of end-portion circumferential belt provided in respective tire widthwise tread end regions on the outer side of the carcass and on the inner side of the circumferential belt layer in the tire radial direction; and at least one layer of slant belt provided in the tire widthwise tread central region on the outer side of the carcass and on the inner side of the circumferential belt layer in the tire radial direction.

In another aspect of the present invention, the pneumatic tire is characterized in that the at least one slant belt layer is disposed at the same height as the at least one end-portion circumferential belt layer in the tire radial direction to apparently constitute a single layer together.

In yet another aspect of the present invention, the pneumatic tire is characterized in that fiber direction of belt cords of the slant belt layer is inclined at an inclination angle of at least 40° with respect to the tire equatorial line.

In yet another aspect of the present invention, the pneumatic tire is characterized in that respective end portions in the tire widthwise direction of the circumferential belt layer are disposed within 5 mm to 20 mm on the inner side in the tire widthwise direction of respective end portions in the tire widthwise direction of the intersecting belt layer having the largest width among a plurality of the intersecting belt layers.

In yet another aspect of the present invention, the pneumatic tire is characterized in that an interlayer rubber made of a rubber material having modulus at 100% elongation ≤5.0 MPa is provided between the circumferential belt layer and the intersecting belt layer.

Advantageous Effect of the Invention

According to the one aspect of the pneumatic tire of the present invention, the tire has at least one layer of end-portion circumferential belt provided in respective tire widthwise tread end regions on the outer side of the carcass and on the inner side of the circumferential belt layer in the tire radial direction and at least one layer of slant belt provided in the tire widthwise tread central region on the outer side of the carcass and on the inner side of the circumferential belt layer in the tire radial direction, whereby the tire can have a belt structure capable of well improving tire durability, while suppressing an increase in weight of the tire.

Further, according to the another aspect of the pneumatic tire of the present invention, the at least one slant belt layer may be disposed at the same height as the at least one end-portion circumferential belt layer in the tire radial direction to apparently constitute a single layer together.

Yet further, according to the yet another aspect of the pneumatic tire of the present invention, fiber direction of belt cords of the slant belt layer is inclined at an inclination angle of at least 40° with respect to the tire equatorial line, whereby tire performance when a tire rides over a projection or the like (i.e. burst resistance of the tire) can be remarkably improved.

Yet further, according to the yet another aspect of the pneumatic tire of the present invention, respective end portions in the tire widthwise direction of the circumferential belt layer are disposed within 5 mm to 20 mm on the inner side in the tire widthwise direction of respective end portions in the tire widthwise direction of the intersecting belt layer having the largest width among a plurality of the intersecting belt layers, whereby the circumferential belt layer can demonstrate sufficiently high tension when the tire is in contact with the ground with load exerted thereon and partial wear of the tread portion due to localized decrease in ground contact pressure can be well suppressed.

Yet further, according to the yet another aspect of the pneumatic tire of the present invention, an interlayer rubber made of a rubber material having modulus at 100% elongation ≤5.0 MPa is provided between the circumferential belt layer and the intersecting belt layer, whereby interlayer shear strain at the respective end portions in the tire widthwise direction of the circumferential belt can be effectively reduced to improve tire durability against belt separation.

DESCRIPTION OF THE EMBODIMENTS

An embodiment to implement the present invention will be described with reference to the drawings hereinafter.

Figure 1:
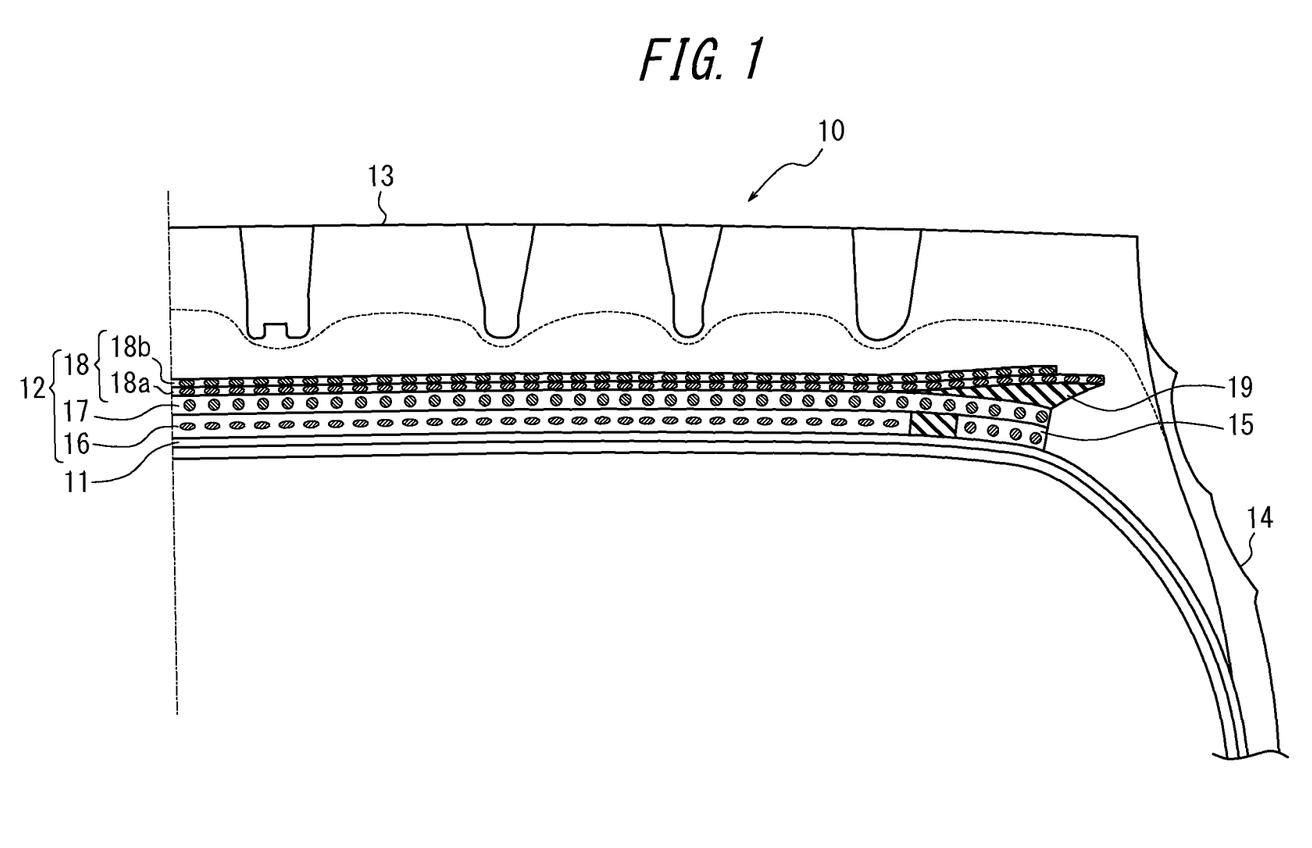
FIG. 1 is a cross sectional view cut along the tire widthwise direction, schematically showing a portion of a structure of a pneumatic tire according to one embodiment of the present invention.

FIG. 1 is a cross sectional view cut along the tire widthwise direction, schematically showing a portion of a structure of a pneumatic tire according to one embodiment of the present invention. As shown in FIG. 1, the pneumatic tire 10 is, for example, a super flat radial tire for heavy load like a truck and bus radial tire (TBR) and has a carcass 11 constituting a skeleton of the tire, a belt 12 provided on the outer side in the tire radial direction of the carcass 11, a tread portion 13 provided on the outer side in the tire radial direction of the belt 12, and sidewall portions 14 provided on the outer side in the tire widthwise direction of the carcass 11 to be continuous with the tread portion 13. The carcass 11 is suspended in a toroidal shape across a pair of bead cores (not shown) each having a ring-like structure.

The belt 12 has a layered structure in which at least one layer of end-portion circumferential belt 15, at least one layer of slant belt 16, at least one circumferential belt layer 17, and plural intersecting belt layers 18 are provided on the outer side in the tire radial direction of the carcass 11 in this order. The end-portion circumferential layer 15 and the slant belt layer 16 are disposed at the same height in the tire radial direction, thereby apparently constituting a single layer. An interlayer rubber 19 is provided between the circumferential belt layer 17 and the intersecting belt layers 18. In the present embodiment, there will be described as an example a case where the tire has a single layer of the end-portion circumferential layer 15, a single layer of the slant belt layer 16, a single layer of the circumferential belt layer 17 and double layers (18a, 18b) of the intersecting belt layers 18. These belts are each formed by subjecting plural belt cords made of a steel fiber material or an organic fiber material to calendering.

The end-portion circumferential belt layer 15 is provided in respective tire widthwise tread end regions on the outer side in the tire radial direction of the carcass 11 such that each end-portion circumferential belt layer 15 extends in a region ranging from the outermost end in the tire widthwise direction of the circumferential belt layer 17 to a position 40 mm or less (20 mm to 40 mm) on the inner side in the tire widthwise direction from the outermost end.

The slant belt layer 16 is preferably provided in the tire widthwise tread central region on the outer side in the tire radial direction of the carcass 11 such that the slant belt layer 16 extends on the inner side in the tire widthwise direction of the respective end-portion circumferential belt layers 15 to be juxtaposed therewith and constitute apparently a single layer together with the end-portion circumferential belt layers 15.

In the present invention, it is assumed that the slant belt layer 16 and the end-portion circumferential belt layers 15 "apparently constitute a single (the same) layer" when distances in the tire radial direction between i) the centers of cords of the slant belt layer 16 and the centers of cords of the circumferential belt layer 17 adjacent on the outer side in the tire radial direction of the slant belt layer 16 and ii) the centers of cords of the end-portion circumferential belt layer 15 and the centers of cords of the circumferential belt layer 17 are within the range of 1.5 mm to 3.0 mm, respectively.

A gap between the end-portion circumferential belt layer 15 and the slant belt layer 16 apparently constituting a single layer is filled with a rubber material in the present embodiment. However, the present invention is not restricted in this regard and the gap may be filled with rubber and cords of a portion of the circumferential belt layer 17 above the end-portion circumferential belt layer 15 and the slant belt layer 16, which portion has drooped into the gap.

The circumferential belt layer 17 is disposed on the outer side in the tire radial direction of the end-portion circumferential belt layer 15 and the slant belt layer 16. In other words, the end-portion circumferential belt layer 15 and the slant belt layer 16 are disposed as a single layer interposed between the carcass 11 and the circumferential belt layer 17.

Accordingly, it can be said that the circumferential belt layer 17 is structured to be single-layer in the tire widthwise tread central region and dual-layer (i.e. the circumferential belt layer 17 and the end-portion circumferential belt layer 15) in each tire widthwise end region or a region ranging from the outermost end in the tire widthwise direction of the circumferential belt layer 17 to a position 40 mm or less on the inner side in the tire widthwise direction from the outermost end. As a result, generation of partial wear can be well suppressed in each of the tire widthwise tread end regions (i.e. tread shoulder portions).

The end-portion circumferential belt layer 15 and the circumferential belt layer 17 share the same belt layer structure in which fiber directions of belt cords are substantially in parallel with the tire circumferential direction or inclined with respect to the tire circumferential direction at an angle in the range of 1° to 2°. The end-portion circumferential belt layer 15 and the circumferential belt layer 17 are preferably each manufactured by: preparing either wavy cords, i.e. wavy-formed inextensional cords or linear cords such as high-elongation cords; preparing narrow-width strips by coating the cords with rubber; and spirally winding the strips around the carcass in the tire circumferential direction.

Fiber direction of belt cords of the slant belt layer 16 is inclined with respect to the tire circumferential direction (the tire equatorial line) at an angle in the range of 40° to 90°; and the belt width of the slant belt layer 16 is at least 20 mm (20 mm to 80 mm) shorter than the belt width of the circumferential belt layer 17.

The belt width of the circumferential belt layer 17 is to be in the range of 70% to 90% and preferably at least 75% of the overall width of the tire. Further, respective end portions in the tire widthwise direction of the circumferential belt layer 17 are disposed within 5 mm to 20 mm on the inner side in the tire widthwise direction of respective end portions in the tire widthwise direction of an intersecting belt layer 18a having the largest width among a plurality of the intersecting belt layers 18. The aforementioned structural features regarding the circumferential belt 17 are applied to each circumferential belt layer 17 when there are provided plural circumferential belt layers 17.

The intersecting belt layers 18 have belt widths in the range of 70% to 90% of the overall width of the tire, respectively, and are structured to be dual-layer, including the intersecting belt layer 18a having a wider belt width than the circumferential belt layer 17 and an intersecting belt layer 18b having a narrower belt width than the intersecting belt layer 18a. The intersecting belt layer 18b is stacked on the outer side in the tire radial direction of the intersecting belt layer 18a. In short, at least one layer of the plural intersecting belt layers 18 has a belt width wider than the belt width of the circumferential belt layer 17.

The intersecting belt layers 18 are disposed such that fiber direction of belt cords thereof is inclined with respect to the tire circumferential direction (the tire equatorial line) at a designated angle or an angle in the range of 15° to 40°. The respective layers of the plural intersecting belt layers 18 are stacked such that the fiber direction of belt cords of one layer is opposite, with respect to the tire circumferential direction, to the fiber direction of belt cords of another layer stacked thereon and thus the former intersects the latter (e.g. the former is left hand side-down and right hand side-up, while the latter is left hand side-up and right hand side-down in a top view).

The interlayer rubber 19 is made of a rubber material having modulus at 100% elongation or Mod. in the range of 1.5 MPa to 5.0 MPa, for example, Mod. ≤5.0 MPa, wherein "Mod." Represents modulus at 100% elongation measured at the room temperature, for example, 25° C. by the method according to JIS K6251. The interlayer rubber 19 is disposed in each of the respective tire widthwise tread end regions between the circumferential belt 17 and the intersecting belt 18 (specifically, the intersecting belt layer 18a having a width which is the largest among the plural intersecting belt layers 18 and wider than the width of the circumferential belt layer 17 in the present embodiment). The interlayer rubber 19 is formed such that it has a wedge-like cross sectional configuration in the tire widthwise direction, increasing the interlayer thickness (gauge: Ga.) thereof on the circumferential belt layer 17 side, i.e. on the inner side on the tire radial direction, from one end on the tread central side to the other end on the outer side in the tire widthwise direction thereof. The maximum interlayer thickness (the interlayer thickness at the outermost end portions in the tire widthwise direction) of at least 3.0 mm can be ensured between the circumferential belt layer 17 and the intersecting belt layer 18a because the interlayer rubber 19 is formed to have a wedge-like cross section in the tire widthwise direction as described above.

The belt width of the circumferential belt layer 17 is to be in the range of 70% to 90% of the overall width of the tire in the belt structure of the pneumatic tire 10 of the present invention, as described above, because configuration of the tire cannot be adequately retained to significantly deteriorate durability of the tire when the belt width of the circumferential belt layer 17 is less than 70% of the overall width of the tire. In this connection, configuration of the pneumatic tire 10 when the tire is inflated at the prescribed internal pressure can be adequately retained by disposing at least one slant belt layer 16 on the inner side in the tire radial direction and the intersecting belt layers 18 on the outer side in the tire radial direction of the circumferential belt layer 17, respectively.

The belt widths of the intersecting belt layers 18 need to be at least 70% of the overall with of the tire, respectively, in order to improve wear resistance performance of the pneumatic tire 10. Generation of partial wear at the tread shoulder portions may be facilitated when the respective belt widths of the intersecting belt layers 18 are less than 70% of the overall width of the tire.

Further, the circumferential belt layer 17 can demonstrate sufficiently high tension when the tire is in contact with the ground with load exerted thereon, by disposing the respective end portions in the tire widthwise direction of the circumferential belt layer 17 within 5 mm to 20 mm on the inner side in the tire widthwise direction of the respective end portions in the tire widthwise direction of the intersecting belt layers 18 (the intersecting belt layer 18a in the present embodiment). The circumferential belt layer 17, thus demonstrating sufficiently high tension when the tire is in contact with the ground with load exerted thereon, makes ground contact pressure satisfactorily uniform across the tread from the center portion to the respective end portions (the tread shoulder portions) thereof, thereby well suppressing partial wear of the tread due to localized decrease in ground contact pressure therein.

The end-portion circumferential belt layer 15 and the circumferential belt layer 17 must be stacked on each other in the respective end regions in the tire widthwise direction of the circumferential belt layer, i.e. the circumferential belt layer must be plural-layer in the respective end regions in the tire widthwise direction thereof, in order to cause the circumferential belt layer 17 to demonstrate sufficiently high tension when the tire is in contact with the ground with load exerted thereon. Adequately retaining tread configuration when the tire is inflated at the prescribed internal pressure, by provision of the end-portion circumferential belt layer 15, can be made compatible with good suppression of increase in tire weight as long as the belt width of the end-portion circumferential belt layer 15 for making the circumferential belt layer partially dual-layer is set to be within 40 mm (20 mm to 40 mm).

It is known that the lower-aspect ratio tire experiences the larger bending deformation in the tire widthwise direction when the tire rides over a projection or the like on a road during running. Ensuring good strength of steel cords in the tire widthwise direction is therefore required in order to address such relatively large bending deformation in the tire widthwise direction in a low-aspect ratio tire. Increasing strength of steel cords on the inner side in the tire radial direction is an effective measure or effectively ensures good strength of steel cords in the tire widthwise direction because of the bending deformation characteristics of the steel cords on the inner side in the tire radial direction working advantageously in this regard. In short, it is effective to provide cords having high strength on the outer side in the radial direction of portions susceptible to bending deformation.

In view of the fact described above, it is possible to remarkably improve projection riding-over properties (burst resistance) of the tire by providing the slant belt layer 16 to be adjacent on the inner side in the tire radial direction of the circumferential belt layer 17. Improving burst resistance of a tire by provision of the slant belt layer 16 can be made compatible with good suppression of increase in tire weight by setting the belt width of the slant belt layer 16 to be at least 20 mm (in the range of 20 mm to 80 mm), preferably at least 40 mm narrower than the belt width of the circumferential belt 17. Further, provision of the interlayer rubber 19 made of a rubber material having modulus at 100% elongation ≤5.0 MPa between the circumferential belt layer 17 and the intersecting belt layers 18 effectively reduces interlayer shear strains in the respective end portions in the tire widthwise direction of the circumferential belt 17, thereby improving durability against belt separation of the tire.

As described above, the pneumatic tire 10 can have a belt structure excellent in wear resistance, durability, and projection riding-over properties by provision of the end-portion circumferential belt layer 15 and the slant belt layer 16 juxtaposed in the tire widthwise direction between the circumferential belt layer 17 and the carcass 11 such that the end-portion circumferential belt layer 15 and the slant belt layer 16 apparently constitute a single layer.

EXAMPLES

Four types of test tires as the pneumatic tires 10 according to the present invention (Examples 1 to 4), as well as one type of prior art reference tire and two types of comparative-example tires (Comparative Examples 1 and 2), were prepared and endurance distance, presence/absence of carcass ply fracture, and tire weight of these tires were comparatively analyzed.

Figure 2:
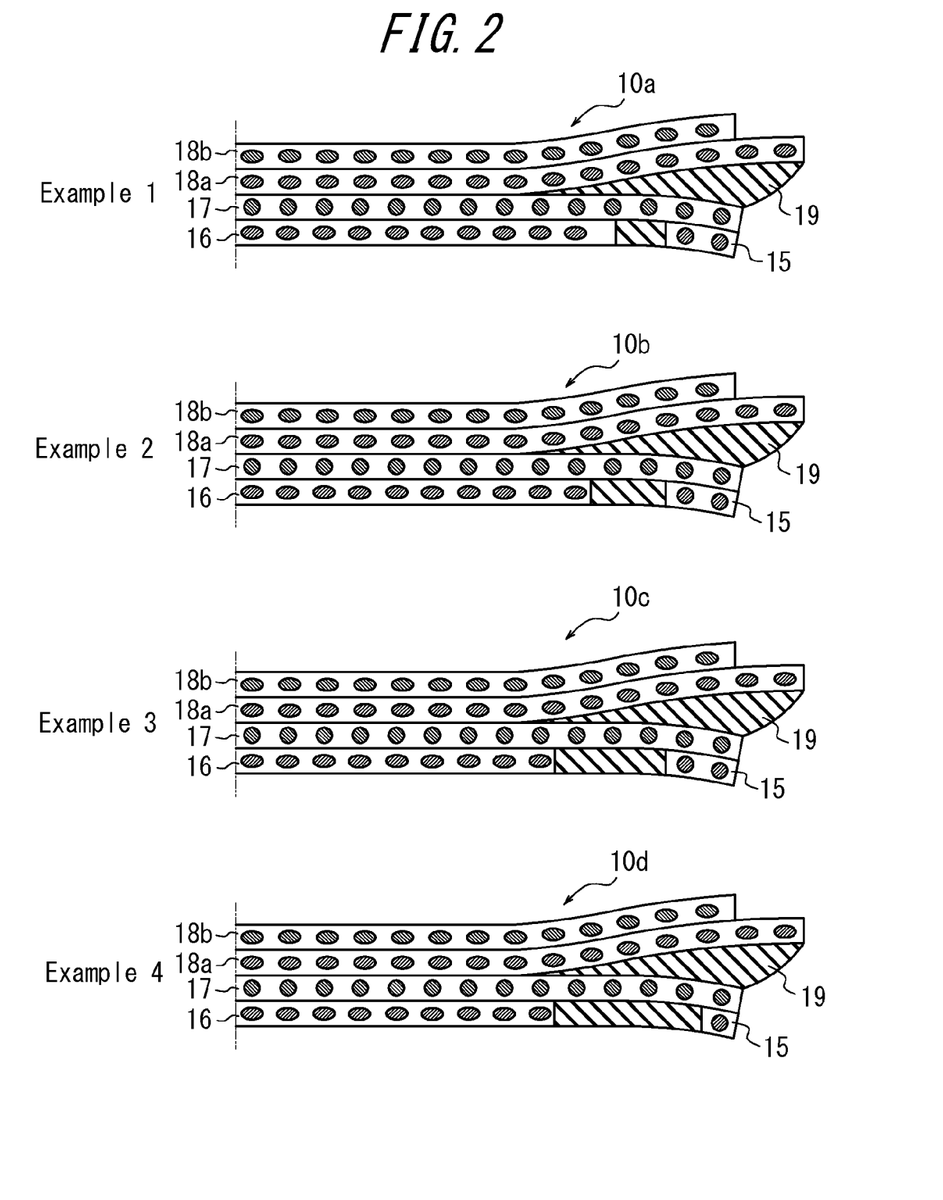
FIG. 2 is a set of explanatory cross sectional views showing conceptions of belt structures of the pneumatic test tires of Examples 1 to 4, respectively.
Figure 3:
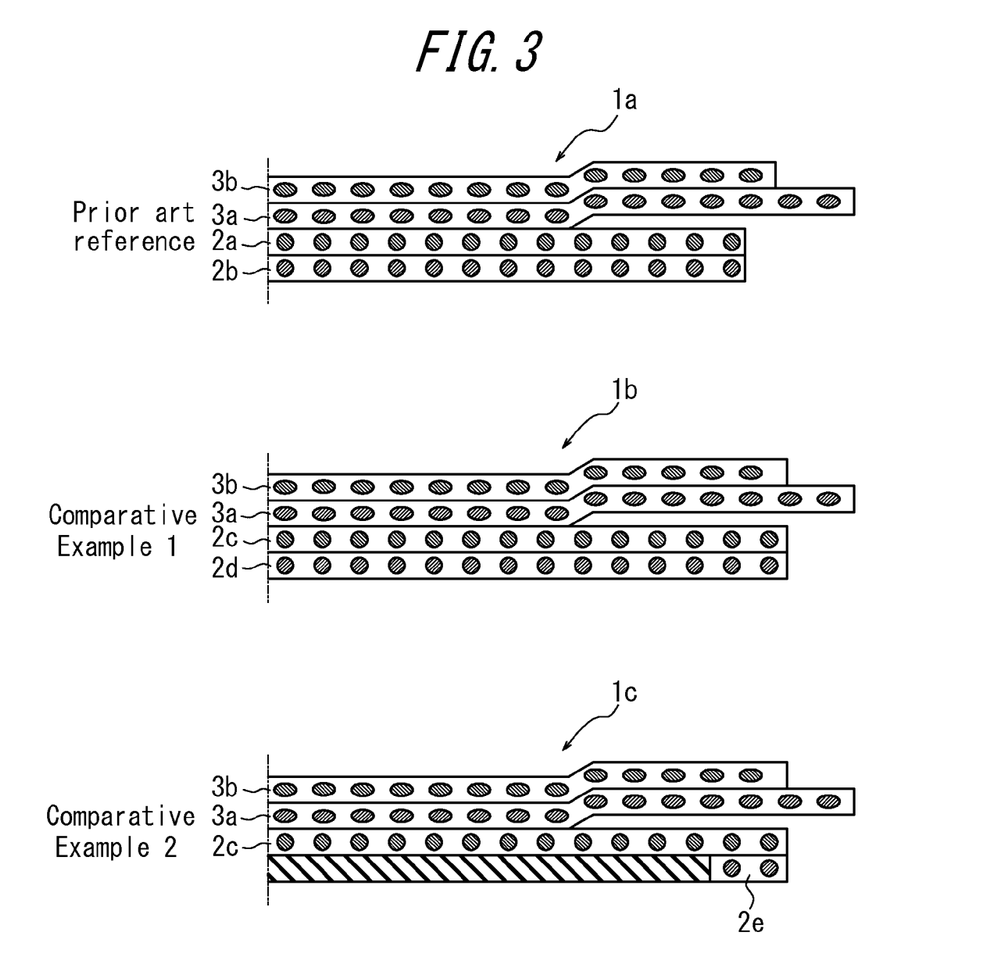
FIG. 3 is a set of explanatory cross sectional views showing conceptions of belt structures of the pneumatic tires of Prior art reference and Comparative Examples 1 and 2, respectively.

FIG. 2 is a set of explanatory cross sectional views showing conceptions of belt structures of the pneumatic test tires of Examples 1 to 4, respectively. FIG. 3 is a set of explanatory cross sectional views showing conceptions of belt structures of the pneumatic tires of prior art reference and Comparative Examples 1 and 2, respectively.

The pneumatic tires 10a to 10d of Examples 1 to 4 as the test tires according to the present invention each have a layered structure as shown in FIG. 2, in which the end-portion circumferential belt layer 15 and the slant belt layer 16 constituting a single layer, the circumferential belt layer (a first circumferential belt layer) 17, a first intersecting belt layer 18a, and a second intersecting belt layer 18b are provided on the outer side in the tire radial direction of the carcass 11 in this order. The interlayer rubber 19 is provided between the circumferential belt layer 17 and the first intersecting belt layer 18a such that the interlayer rubber 19 has a wedge-like cross section in the tire widthwise direction. Specifically, there exists a space which allows the interlayer rubber 19 to be provided between the circumferential belt layer 17 and the first intersecting belt layer 18a because the circumferential belt layer 17 extends along the carcass 11 and the first intersecting belt layer 18a extends substantially in parallel to the tire widthwise direction.

The pneumatic tire 1a as the test tire of prior art reference has a layered structure as shown in FIG. 3, in which: two circumferential belt layers constituted of a first circumferential belt layer 2a and a second circumferential belt layer 2b having the same width in the tire widthwise direction; and two intersecting belt layers constituted of a first intersecting belt layer 3a and a second intersecting belt layer 3b having different widths in the tire widthwise direction, are provided on the outer side in the tire radial direction of the carcass (not shown) in this order.

The pneumatic tire 1b of Comparative Example 1 has a belt structure similar to that of the pneumatic tire 1a of the prior art reference, except that the former has, in place of the first circumferential belt layer 2a and the second circumferential belt layer 2b, a first circumferential belt layer 2c and a second circumferential belt layer 2d having widths in the tire widthwise direction longer than those of the first circumferential belt layer 2a and the second circumferential belt layer 2b. The pneumatic tire 1c of Comparative Example 2 has a belt structure similar to that of the pneumatic tire 1b of Comparative Example 1, except that the former has, instead of the second circumferential belt layer 2d, an end-portion circumferential belt layer 2e disposed only on each tread end portion side in the tire widthwise direction so that the circumferential belt layer thereof is structured to be single-layer in the tire widthwise tread central region and dual-layer in the respective tire widthwise tread end regions.

The pneumatic tires 10a to 10d of Examples 1 to 4, the pneumatic tire 1a of the prior art reference, and the pneumatic tires 1b, 1c of Comparative Examples 1 and 2 described above are unanimously ultra low-aspect ratio tires for heavy load each having tire size: 495/45R22.5.

Respective component elements of the tires of Examples 1 to 4, the prior art reference and Comparative Examples 1 and 2 will be described with reference to Table 1 and Table 2 hereinafter. "L" represents left hand side-up and right hand side-down slant and "R" represents left hand side-down and right hand side-up slant, respectively, in each angle column "[deg]" in Tables 1 and 2.

Overall tire width: 505 mm unanimously in Examples 1 to 4, the prior art reference and Comparative Examples 1 and 2

Width of the intersecting belt layer 18a, 3a: 420 mm unanimously in Examples 1 to 4, the prior art reference and Comparative Examples 1 and 2

Width of the intersecting belt layer 18b, 3b: 390 mm unanimously in Examples 1 to 4, the prior art reference and Comparative Examples 1 and 2

Layer structure in a portion where the circumferential belt layer is disposed: The circumferential belt layer is structured to be single-layer (the circumferential belt layer 17) in the tire widthwise tread central region and dual-layer (the circumferential belt layer 17 and the end-portion circumferential belt layer 15) in the respective tire widthwise tread end regions in Examples 1 to 4.

The circumferential belt layer is structured to be entirely dual-layer (the first and second circumferential belt layers 2a, 2b) in the tire widthwise direction in the prior art reference. The circumferential belt layer is structured to be entirely dual-layer (the first and second circumferential belt layers 2c, 2d) in the tire widthwise direction in Comparative Example 1.

The circumferential belt layer is structured to be single-layer (the circumferential belt layer 2c) in the tire widthwise tread central region and dual-layer (the circumferential belt layer 2c and the end-portion circumferential belt layer 2e) in the respective tire widthwise tread end regions in Comparative Example 2.

Widths in the tire widthwise direction of respective circumferential belt layers:

The width of the circumferential belt layer 17 is unanimously 390 mm in Examples 1 to 4.

The width of the end-portion circumferential belt layer 15 is 40 mm in Examples 1 to 3 and 20 mm in Example 4. The widths of the first and second circumferential belt layers 2a, 2b of the prior art reference are both 370 mm. The widths of the first and second circumferential belt layers 2c, 2d of Comparative Example 1 are both 390 mm. The width of the first circumferential belt layer 2c is 390 mm and the width of the end-portion circumferential belt layer 2e is 40 mm in Comparative Example 2.

Belt width of the slant belt layer 16:

The tires of Examples 1 to 4 each include the slant belt layer 16. The belt width of the slant belt layer 16 is 20 mm narrower in Example 1, 40 mm shorter in Example 2, and 60 mm shorter in Examples 3 and 4 (that is, at least 20 mm narrower in each of Examples 1 to 4) than the belt width of the circumferential belt layer 17.

Interlayer gauge:

Interlayer gauge on the tire widthwise tread central side (the inner side gauge) differs from interlayer gauge on the tire widthwise tread end side (the end portion gauge) in Examples 1 to 4. Specifically, the inner side gauge is unanimously 1.8 mm in Examples 1 to 4, while the end portion gauge is 3.0 mm in Example 1, 3.5 mm in Example 2, and 5.0 mm in Examples 3 and 4. In contrast, interlayer gauge does not vary in the tire widthwise direction in the prior art reference and Comparative Examples 1 and 2 and is 1.8 mm in the prior art reference and Comparative Example 1 and 3.0 mm in Comparative Example 2, respectively.

Modulus at 100% elongation (mod.) of the interlayer rubber 19:

Modulus at 100% elongation of the interlayer rubber 19 is 6.0 MPa in Examples 1 and 2, 4.0 MPa in Example 3, 1.8 MPa in Example 4, and 6.0 MPa in the prior art reference and Comparative Examples 1 and 2.

TABLE 1

|  |  | Prior art reference | Comp. Example 1 | Comp. Example 2 | Example 1 |
|---|---|---|---|---|---|
| Tire width |  | 505 | 505 | 505 | 505 |
| Slant belt layer 16 | Angle [deg] | — | — | — | L50 |
|  | Width [mm] | — | — | — | 370 |
| First circumferential belt layer | Angle [deg] | 1 to 2 | 1 to 2 | — | — |
|  | Width [mm] | 370 | 390 | — | — |
| Second circumferential belt layer | Angle [deg] | 1 to 2 | 1 to 2 | 1 to 2 | 1 to 2 |
|  | Width [mm] | 370 | 390 | 390 | 390 |
| End-portion circumferential belt layer | Angle [deg] | — | — | 1 to 2 | 1 to 2 |
|  | Width [mm] | — | — | 40 | 40 |
| First intersecting belt layer | Angle [deg] | R50 | R50 | R50 | R40 |
|  | Width [mm] | 420 | 420 | 420 | 420 |

TABLE 1-continued

|  |  | Prior art reference | Comp. Example 1 | Comp. Example 2 | Example 1 |
|---|---|---|---|---|---|
| Second intersecting belt layer | Angle [deg] | L50 | L50 | L50 | L40 |
|  | Width [mm] | 390 | 390 | 390 | 390 |
| Interlayer gauge | End portion gauge [mm] | 1.8 | 1.8 | 3.0 | 3.0 |
|  | Width [mm] | 20 | 20 | 20 | 20 |
|  | Inner side gauge [mm] | 1.8 | 1.8 | 1.8 | 1.8 |
| Interlayer rubber Mod. | [MPa] | 6.0 | 6.0 | 6.0 | 6.0 |
| Endurance distance | INDEX | 100 | 75 | 105 | 110 |
| Carcass ply fracture | Presence/absence | None | None | Present | None |
| Tire wear amount | INDEX | 100 | 105 | 93 | 98 |

TABLE 2

|  |  | Example 2 | Example 3 | Example 4 |
|---|---|---|---|---|
| Tire width |  | 505 | 505 | 505 |
| Slant belt layer 16 | Angle [deg] | L50 | L50 | L50 |
|  | Width [mm] | 350 | 350 | 330 |
| First circumferential belt layer | Angle [deg] | — | — | — |
|  | Width [mm] | — | — | — |
| Second circumferential belt layer | Angle [deg] | 1 to 2 | 1 to 2 | 1 to 2 |
|  | Width [mm] | 390 | 390 | 390 |
| End-portion circumferential belt layer | Angle [deg] | 1 to 2 | 1 to 2 | 1 to 2 |
|  | Width [mm] | 40 | 40 | 20 |
| First intersecting belt layer | Angle [deg] | R35 | R30 | R25 |
|  | Width [mm] | 420 | 420 | 420 |
| Second intersecting belt layer | Angle [deg] | L35 | L30 | L25 |
|  | Width [mm] | 390 | 390 | 390 |
| Interlayer gauge | End portion gauge [mm] | 3.5 | 5.0 | 5.0 |
|  | Width [mm] | 20 | 25 | 25 |
|  | Inner side gauge [mm] | 1.8 | 1.8 | 1.8 |
| Interlayer rubber Mod. | [MPa] | 6.0 | 4.0 | 1.8 |
| Endurance distance | INDEX | 115 | 118 | 130 |
| Carcass ply fracture | Presence/absence | None | None | None |
| Tire wear amount | INDEX | 96 | 94 | 94 |

In short, the circumferential belt layer is structured to be entirely dual-layer in the tire widthwise direction in the prior art reference and Comparative Example 1, while single-layer in the tire widthwise tread central region and dual-layer in the respective tire widthwise tread end regions in Comparative Example 2. In contrast, the circumferential belt layer is structured to be single-layer (the circumferential belt layer 17) in the tire widthwise tread central region and dual-layer (the circumferential belt layer 17 and the end-portion circumferential belt layer 15) in the respective tire widthwise tread end regions in Examples 1 to 4.

Each of the test tires, having the aforementioned size, was assembled with an application rim having rim size: 17.00× 22.5, inflated at the standard internal pressure of 900 kPa and then subjected to a durability test and a projection riding-over property test under a prescribed load of 5800 kg. Tire weight of each of the test tires was also measured before and after these tests (see Table 1 and Table 2).

In the present invention, "application rim" represents either "Application Rim" prescribed in JATMA (The Japan Automobile Tyre Manufacturers Association, Inc.) or "Design Rim" prescribed in TRA (THE TIRE AND RIM ASSOCIATION INC.) or "Measuring Rim" prescribed in ETRTO (The European Tyre and Rim Technical Organisation); "standard internal pressure" represents either "the maximum internal air pressure" prescribed in JATMA or the maximum value of "TIRE LOAD LIMITS AT VARIOUS COLD INFLATION PRESSURES" prescribed in TRA, or "INFLATION PRESSURES" prescribed in ETRTO; and a "prescribed load" represents "the maximum loading capability" prescribed in JATMA or the maximum value of "TIRE LOAD LIMITS AT VARIOUS COLD INFLATION PRESSURES" prescribed in TRA, or "LOAD CAPACITY" prescribed in ETRTO.

Durability test:
Each of the test tires was made to run at drum rotation speed 75 km/hour and tire running distance before occurrence of tread separation troubles, i.e. endurance distance, was measured in the running state of the tire.

Projection riding-over properties:
Presence/absence of carcass ply fracture after each of the test tires rode over a projection having diameter ($\phi$): 35 mm and height: 100 mm in the running state of the tire was investigated.

Following evaluation results were obtained by comparing the measurement results of the pneumatic tires 10a to 10d of Examples 1 to 4 according to the present invention with the measurement results of the tires of the prior art reference and Comparative Examples 1 and 2, with regard to tire durability, projection riding-over properties, and tire wear amount.

Endurance distance (the larger value represents the better performance):
The results expressed as index values are 110 in Example 1, 115 in Example 2, 118 in Example 3, and 130 in Example 4, as compared with 75 in Comparative Example 1 and 105 in Comparative Example 2, with respect to 100 in the prior art reference. That is, the tires of Examples 1 to 4 unanimously exhibited at least 10% (maximally 30%) increase in endurance distance, as compared with the prior art reference.

Carcass ply fracture:
The tires of Examples 1 to 4 each exhibited no carcass ply fracture. The tires of the prior art reference and Comparative Example 1 each exhibited no carcass ply fracture, either. In contrast, the tire of Comparative Example 2 exhibited carcass ply fracture.

Tire wear amount (the smaller value represents the better performance):
Wear amount of each of the test tires was measured. The results expressed as index values are 98 in Example 1, 96 in Example 2, 94 in Example 3, and 94 in Example 4, as compared with 105 in Comparative Example 1 and 93 in Comparative Example 2, with respect to 100 in the prior art reference. These index values represent difference in tire weight before and after the tests, i.e. tire wear amount, of the tires of Examples 1 to 4 and Comparative Examples 1 and 2 relative to that of the prior art reference being 100. It is confirmed from these results that tire wear amount was reduced by 2% in Example 1, 4% in Example 2, 6% in Example 3, 6% in Example 4, as compared with the prior art reference. It should be noted in this connection that the tire of Comparative Example 1 exhibited an larger amount of tire wear than the tire of the prior art reference because the circumferential belt of the Comp. Example 1 tire is structured to be entirely dual-layer and wider than the circumferential belt layer of the prior art reference.

The end-portion circumferential belt layer 15 and the slant belt layer 16 are disposed between the circumferential belt layer 17 and the carcass 11 such that the end-portion circumferential belt layer 15 and the slant belt layer 16 extend juxtaposed in the tire widthwise direction to apparently constitute a single layer together in the pneumatic tire 10, as described above. That is, occurrence of partial wear in the tread shoulder portions is suppressed by structuring the circumferential belt layer to be single-layer in the tire widthwise tread central region and dual-layer in the respective tire widthwise tread end regions and projection riding-over properties is improved by providing the slant belt layer on the inner side in the tire radial direction of the circumferential belt layer. As a result, there can be obtained a pneumatic tire having a belt structure excellent in wear resistance, durability, and projection riding-over properties without increasing weight of the tire.

INDUSTRIAL APPLICABILITY

According to the present invention, it is possible to obtain a tire having a belt structure capable of improving tire durability with suppressing increase in weight of the tire. This tire is most suitable for a pneumatic radial tire for heavy load such as a truck and bus radial tire (TBR), which employs a circumferential belt for retaining adequate tire tread configuration.

REFERENCE SIGNS LIST 10, 10a to 10d Pneumatic tire
11 Carcass
12 Belt
13 Tread portion
14 Sidewall portion
15 End-portion circumferential belt layer
16 Slant belt layer
17 Circumferential belt layer
18, 18a, 18b Intersecting belt layer
19 Interlayer rubber

The invention claimed is:

1. A pneumatic tire having a carcass, a circumferential belt layer provided on the outer side in the tire radial direction of the carcass, and two intersecting belt layers provided on the outer side in the tire radial direction of the circumferential belt layer, at least one of the two intersecting belt layers having wider belt width in the tire widthwise direction than the circumferential belt layer, comprising:

two end-portion circumferential belt layers provided in respective tire widthwise tread end regions on the outer side of the carcass and on the inner side of the circumferential belt layer in the tire radial direction; and a layer of slant belt provided in the tire widthwise tread central region on the outer side of the carcass and on the inner side of the circumferential belt layer in the tire radial direction, wherein the slant belt layer is disposed at the same height as the two end-portion circumferential belt layers in the tire radial direction to constitute a single layer together, the circumferential belt layer is structured as a single layer in the tire widthwise central region and as a dual-layer in the tire widthwise tread end regions, the dual layer layers are directly adjacent to each other in the radial direction in each tire widthwise end region, and there are only six belt layers between the carcass and a tread surface of the pneumatic tire and the six belt layers are constituted of the circumferential belt layer, the two intersecting belt layers, the one slant belt layer, and the two end-portion circumferential belt layers in the respective tire widthwise tread end portions.

2. The pneumatic tire of claim 1, wherein fiber direction of belt cords of the slant belt layer is inclined at an inclination angle of at least 40° with respect to the tire equatorial line.

3. The pneumatic tire of claim 2, wherein fiber direction of belt cords of the slant belt layer is inclined at an inclination angle smaller than 45° with respect to the tire equatorial line.

4. The pneumatic tire of claim 1, wherein respective end portions in the tire widthwise direction of the circumferential belt layer are disposed within 5 mm to 20 mm on the inner side in the tire widthwise direction of respective end portions in the tire widthwise direction of an intersecting belt layer having the largest width among the intersecting belt layers.

5. The pneumatic tire of claim 1, wherein an interlayer rubber made of a rubber material having modulus at 100% elongation ≤5.0 MPa is provided between the circumferential belt layer and a radially innermost intersecting belt layer of the intersecting belt layers.

6. The pneumatic tire of claim 1, wherein the circumferential belt layer is structured to be dual-layer only in each region ranging from the corresponding outermost end in the tire widthwise direction thereof to a position 40 mm or less on the inner side in the tire widthwise direction from the outermost end.

7. The pneumatic tire of claim 1, wherein a gap between each end-portion circumferential belt layer and the slant belt layer constituting a single layer is filled with a rubber material.

* * * * *